United States Patent
Roth (10) Patent No.: US 10,183,343 B2
(45) Date of Patent: Jan. 22, 2019

(54) DRILL BIT FOR DRILLING LAMINATES

(71) Applicant: WALTER AG, Tubingen (DE)

(72) Inventor: Edwin Roth, Oberharmersbach (DE)

(73) Assignee: WALTER AG, Tubingen (DE)

( * ) Notice: Subject to any disclaimer, the term of this patent is extended or adjusted under 35 U.S.C. 154(b) by 0 days.

(21) Appl. No.: 15/560,403

(22) PCT Filed: Dec. 22, 2015

(86) PCT No.: PCT/EP2015/081038
§ 371 (c)(1),
(2) Date: Sep. 21, 2017

(87) PCT Pub. No.: WO2016/150534
PCT Pub. Date: Sep. 29, 2016

(65) Prior Publication Data
US 2018/0065190 A1 Mar. 8, 2018

(30) Foreign Application Priority Data
Mar. 23, 2015 (EP) .................................. 15160342

(51) Int. Cl.
*B23B 51/02* (2006.01)
(52) U.S. Cl.
CPC .......... *B23B 51/02* (2013.01); *B23B 2228/36* (2013.01); *B23B 2251/14* (2013.01);
(Continued)
(58) Field of Classification Search
CPC . Y10T 408/899; B23B 51/02; B23B 2251/08; B23B 2251/14; B23B 2251/18;
(Continued)

(56) References Cited

U.S. PATENT DOCUMENTS 1,000,067 A 8/1911 Bennett
1,418,485 A 6/1922 Hugo
(Continued)

FOREIGN PATENT DOCUMENTS

DE 3325149 A1 * 1/1985 ............. B23B 51/02
DE 20211589 U1 * 1/2004 ............. B23B 51/02
(Continued)

OTHER PUBLICATIONS

Proquest machine translation of JP 2007030491, printed Sep. 2018.*

*Primary Examiner* — Daniel Howell
(74) *Attorney, Agent, or Firm* — Corinne R. Gorski (57) ABSTRACT

A drill bit for drilling laminates includes at least two main chip flutes separated by corresponding webs. The free end faces of the webs form relief surfaces. At least one secondary flute, which is formed in the periphery of each of the webs divides the web into a main and a secondary web. A main cutting edge is formed by the intersection of a main chip flute and a relief surface on the main web. A secondary cutting edge is formed by the intersection of the secondary flute with a relief surface on the secondary web following the main cutting edge in the direction of operation, the main cutting edges extending to the nominal radius of the drill. The secondary cutting edges terminate at a distance before the nominal radius and axially project from the main cutting edge by an axial overhang at least along their radially outer section.

18 Claims, 4 Drawing Sheets

(52) U.S. Cl.
CPC ... *B23B 2251/204* (2013.01); *B23B 2251/207* (2013.01); *B23B 2251/287* (2013.01); *B23B 2251/443* (2013.01); *Y10T 408/899* (2015.01)

(58) Field of Classification Search
CPC .......... B23B 2251/285; B23B 2251/44; B23B 2251/443; B23B 2251/446
See application file for complete search history.

(56) References Cited

U.S. PATENT DOCUMENTS

| | | | |
|---|---|---|---|
| 3,977,807 A * | 8/1976 | Siddall | B23B 51/02 408/223 |
| 4,285,620 A * | 8/1981 | Luebbert | B23B 51/02 408/211 |
| 4,529,341 A | 7/1985 | Greene | |
| 5,486,075 A * | 1/1996 | Nakamura | B23B 51/02 408/224 |
| 2008/0193234 A1 | 8/2008 | Davancens et al. | |
| 2009/0080989 A1* | 3/2009 | Dost | B23B 51/02 408/225 |

FOREIGN PATENT DOCUMENTS

| | | | | |
|---|---|---|---|---|
| EP | 0901860 A1 | * | 3/1999 | ............ B23B 51/00 |
| JP | 2005052939 A | | 3/2005 | |
| JP | 2007030491 A | * | 2/2007 | |
| JP | 2009083092 A | * | 4/2009 | |
| JP | 2010082777 A | * | 4/2010 | |
| JP | 2011073129 A | * | 4/2011 | |
| SU | 512006 A | * | 6/1976 | |
| SU | 1042905 A | * | 9/1983 | |
| WO | WO 2005030418 A1 | * | 4/2005 | ............ B23B 51/02 |
| WO | WO 2012139542 A2 | * | 10/2012 | ............ B23B 51/02 |

* cited by examiner

DRILL BIT FOR DRILLING LAMINATES

RELATED APPLICATION DATA

This application is a § 371 National Stage Application of PCT International Application No. PCT/EP2015/081038 filed Dec. 22, 2015 claiming priority to EP Application No. 15160342.0 filed Mar. 23, 2015.

TECHNICAL FIELD

The present invention relates to a drill, in particular for the drilling of laminates, having at least two main chip flutes separated from one another by corresponding webs, the free end faces of the webs forming relief surfaces and at least one secondary flute formed in the circumferential outer face of each of the webs, which divides the web into a main web and a secondary web, wherein a main cutting edge is formed by the intersection of a main chip flute with an end face on the main web, and wherein a secondary cutting edge is formed by the intersection of the secondary chip flute with a relief surface at the free end face, which secondary cutting edge, as seen in the direction of operation—follows the main cutting edge, the main cutting edges extending up to the nominal radius of the drill.

BACKGROUND

A corresponding drill is known from DE 202 11 589 U1.

The aforesaid prior art, from which the present invention is starting out, provides that the width of the circumferential guiding margins, which correspond to the circumference of the secondary webs, increases in the axial direction starting from the drill point. According to an embodiment of this known drill, it is further provided that the cutting edge of the secondary cutting edge is recessed in the axial direction with respect to the corresponding cutting corner of the main cutting edge, which is ahead of the secondary cutting edge in the working direction.

With such a drill, a bore is thus first produced with the main cutting edge, wall the wall or fringe is still subjected to a post-processing by the subsequent secondary cutting edge. In this way, burrs and fractions of the borehole edge produced by the leading main cutting edge or the borehole wall are to be eliminated by means of the trailing edge. Depending on the type of laminates processed or the materials from which the laminates are composed, in particular when using laminates which contain a considerable amount of hard fiber components, the main cutting edges wear very rapidly so that the service life of these conventional drills within which they are producing a well-defined bore diameter, and smooth wellbore edges without overlying fiber residues or burrs is relatively short.

A disadvantage of the known drills is, therefore, that, in a fresh condition they can still produce relatively clean drill holes and through-holes in laminate material, however, the main cutting edges wear out relatively quickly, especially in the area of the cutting corners, and thus the material to be drilled is no longer cut in a smooth manner, so that the secondary cutting edge, which subsequently operates on the same diameter, must also machine a very uneven bore fringe, which then only succeeds in an insufficient manner.

SUMMARY

In view of the above prior art, it is the object of the present invention to further improve a drill of the type mentioned at the outset in that it has a longer service life during which drilling diameters are better maintained during drilling through laminates and the drill hole edges, in particular on the outlet side of the drilling holes can be produced smoothly and largely without overlying burrs or protruding fiber residues.

For a drill of the type mentioned at the outset, this object is achieved in that the secondary cutting edges terminate at a distance from the nominal radius and have an axial projection with respect to the main cutting edge at least in their radially outer section.

This means that, at least in the region of the drill point, the secondary web or the relief surface formed by the secondary web, respectively, of the secondary edge does not extend up to the full diameter or radius of the drill. The outermost cutting edge of the secondary cutting edge, which protrudes axially from the main cutting edge extending to the nominal radius, is thus on a somewhat smaller radius than the cutting corner of the main cutting edge.

With its radially outer section, which corresponds at most to the radial depth of the secondary flute, the main cutting edge extends preferably without interruption up to the nominal radius. In this context, a step-like offset of the main cutting edge is regarded as an interruption. However, such interruptions of the main cutting edges are of no significance if they lie in a radial region, which, in any case, does not actively get in contact with the workpiece because of the axially protruding secondary cutting edge.

According to one embodiment, the main cutting edges define a peak angle in the range between 60° and 170° at least in the aforementioned radially outer section.

With the radially outer section, in which the main cutting edges in any case define a point angle in the range between 60° and 170°, is meant that radial portion of the main cutting edges which starts immediately before the radial position at which there is an axial overhang of the secondary cutting edge, and which extends as far as the nominal radius, whereby permanently inactive sections of the main cutting edge can be left out of consideration. Such permanently inactive sections are, in particular, those radial sections of the main cutting edge in which the secondary cutting edge has the largest axial projection.

The distance of the cutting edge of the secondary cutting edge from the nominal radius should, for example, be between 0.2% and 5% of the drill diameter and in absolute numbers between 0.01 mm and 0.2 mm. Specifically, a distance of 0.05 mm has proven to be well suited.

Specifically, this means that the secondary cutting edge already produces a circumferential groove in the vicinity of the later borehole wall or in the vicinity of the later borehole edge because of its axial overhang, or in the case of through-bores already an annular breakthrough in the respective material, such that the main cutting edge, which precedes the secondary cutting edge in the working direction, but which is axially recessed with respect to the secondary cutting edge, only needs to cut a thin layer of material to be removed from the borehole wall and the borehole edge in the radial outer region of the bore which results in a precisely produced holes, in particular through holes.

For some laminate materials, it has proved to be expedient in this case if a tertiary cutting edge is additionally provided on one or on each secondary web, which is axially recessed in relation to the main cutting edge as well as with respect to the secondary cutting edge and, in the projection onto a radial plane, covers the distance from the radially outer corner of the secondary cutting edge to the nominal radius of the drill. Concretely, therefore, the secondary web is formed similarly to a stepped diameter drill and has a somewhat smaller radius following the corner where the secondary cutting edge is formed, which is then increased to the nominal radius by a step at an axial distance from the corner, which distance is greater than the overhang of the secondary cutting edge with respect to the main cutting edge and which may be between 0.5 mm and 1.5 mm, the tertiary edge being formed by this step-shaped transition.

The axial overhang of the secondary cutting edge with respect to the main cutting edge is, for example, between 0.1 mm and 0.8 mm. In an embodiment of the invention, this axial projection increases along the secondary cutting edge as the radius increases. In particular, the radial length of the secondary cutting edge can also be limited to a comparatively smaller radius range, namely where the corresponding axial projection is present. This radial length of the secondary cutting edge is in particular less than half the drill radius and preferably less than one third of the drill radius.

The tip angle of the drill defined for the main cutting edges is, as usual, the angle measured in the tip of the drill on the inside between opposing main cutting edges. More generally, it is defined as twice the angle measured on the inside of the drill between a projection of the main cutting edge on a plane containing the axis of the drill and this axis. In this case, this tip angle can vary over the length of the cutting edge, but it is advisable, at least in the radial outer region of the main cutting edge, which begins immediately before the radius range of the axial overlap of the secondary cutting edge and extends up to the nominal radius, that it is 60°, and 170° (each for double the angle enclosed between the respective main cutting portion and the axis).

In contrast to the main cutting edge, according to an embodiment of the invention, the secondary cutting edges are provided to extend over their entire length at a tip angle of between 180° and 200°. This corresponds to a so-called hollow tip or recessed tip, that is to say radially more outwardly lying sections of the secondary cutting edges are axially in front of radially inward sections of the secondary cutting edge such that the angle measured on the inside of the drill between the drill axis and a section of the secondary cutting edge becomes 90° or larger and thus the tip angle exceeds 180°, but preferably does not exceed a value of 200°.

This also means that the axial overhang of the secondary cutting edge is greatest at the radially outermost corner of the secondary cutting edge and becomes smaller and smaller for a radially more inner portion of the secondary cutting edge and finally disappears since due to the maximum tip angle of 170° for the main cutting edges, in the course of the main cutting edge the radially inner sections of the main cutting edge are axially more forward.

In the course of the cutting edges from the outside to the inside, therefore, in such a combination of the tip angles of main cutting edges and secondary cutting edges, the axial overhang of the secondary cutting edge becomes increasingly smaller and finally disappears completely, so that a secondary cutting edge which extends radially further inwards no longer has any function and the, further course of the secondary cutting in the direction towards the axis drill is irrelevant. Expediently, the relief surface of the web, and in particular of the secondary web, in a direction towards the tip of the drill is allowed to rise as far as possible in the axial direction of the drill, in order to stabilize the tip as much as possible. The secondary cutting edge can thus be limited to a small radially outer portion, which typically lies between half the nominal radius and slightly less than the full nominal radius, and is mostly within the range of ¾ of the nominal radius and up to close to the full nominal radius.

In this embodiment with a tip angle of, for example, more than 180° for the secondary cutting edges, the radially outer cutting edges of the secondary cutting edges form the axially furthest front cutting part, and during drilling into the material to be drilled the secondary cutting edge produces a ring-shaped groove in the region of the axial overhang over the main cutting edge, the deepest base of which groove lies near the nominal radius. Radially further inside, the main cutting edge works and creates a central hole. Thus, when a through hole is formed, the drill tip generally pierces through the material at the center of the bore, and before the full drill radius is reached, the secondary cutting edge cuts an annular groove near the nominal radius and creates a breakthrough near the final periphery of the through hole, such that an annular or disk-shaped material section which almost has the nominal diameter of the bore is released when the material is pushed through, while subsequently the radially outer cutting edge of the main cutting edge still removes a thin layer at the edge of the bore.

The production of the annular groove leads, for example, in the perforation of laminates with fiber material to a good severing of the fibers in the region of the cutting edge of the secondary cutting edge, which is particularly successful in that fibers which extend over the cross-section of the bore, which are still anchored on both sides of the groove being generated by the secondary cutting edge, are not torn out from the material, but are smoothly severed, while in the case of a stepwise widening of a central bore, the fibers are first loosened in the center, and cannot be easily separated from the bore edge simply by expanding the bore.

The remaining thin layer of material at the edge or fringe of the bore is then removed by the following cutting corner of the main cutting edge. The tertiary cutting edge can then contribute to the smoothing and removal of excess residues or burrs.

Since in the drill according to the invention the largest, central part of the bore is produced by the main cutting edge and the secondary cutting edge only has a relatively narrow ring or Hollow cylinder section of the material to be drilled, wear of the central part of the main cutting edge effectively does not affect the initially produced fringe of the bore because the cutting corner of the secondary cutting edge only leaves a thin layer of material on the bore wall which is to be removed by the cutting corner of the main cutting edge. A further advantage is that the tip angle of the secondary cutting edge deviates only slightly from 180°, which contributes to a lower load on the cutting corner of the secondary cutting edge.

In a view along the drill axis, the main cutting edges have a concave shape, at least in the region of their radially outer half, which is related to the corresponding design of the flute and which allows the primary minor cutting edge adjoining the main cutting edge and extending on the circumference of the drill to have a positive rake angle.

On the other hand, the secondary minor cutting edges adjoining the secondary cutting edges have a negative radial cutting angle, preferably in the range between 0 and −10°. This serves, inter alia, to maintain the stability of the otherwise very narrow, secondary web, and also allows a more scraping and smoothing cut of the secondary minor cutting edge, which adjoins the already mentioned tertiary cutting edge on the secondary web.

In one embodiment of the invention, the circumferential angle between a primary minor cutting edge and a secondary minor cutting edge which follows it in the working direction is, for example, approximately 65°, and is thus significantly smaller than the circumferential angle between the secondary minor cutting edge and the primary minor cutting edge which follows immediately after the subsequent main chip flute, which is 115°. The difference between these circumferential angles for a drill having two main cutting edges is at least 30° and at most approximately 70°. It is understood that corresponding drills could also be equipped with three main cutting edges and three main chip flutes and the corresponding number of secondary cutting edges and secondary chip flutes, whereby the circumferential angle available between two successive main cutting edges would be reduced from 180 to 120°. Accordingly, the above circumferential angles and also the difference in the circumferential angles between main (or primary) cutting edges and secondary cutting edges, or more precisely between the primary minor cutting edges and the secondary minor cutting edges, would then be reduced to a value of approximately two thirds of the aforementioned angular differences.

Furthermore, according to one embodiment of the drill according to the invention, the cross sectional area of the main chip flutes measured in a cross-sectional plane perpendicular to the drill axis is at least double the cross-sectional area of the secondary chip flutes.

This also takes account in particular of the fact that a large part of the machined material is cut by the main cutting edge and is to be transported away by the main chip flute, whereas the secondary cutting edges only cuts relatively little amount of material near the outer edge of the bore, which can be removed via a chip flute having a correspondingly smaller cross-section.

An effective transport of the chips can also be promoted by the drill being designed as a spiral drill, even if this is only of minor significance, in particular, when drilling laminates which form relatively thin plates.

In the case of a spiral drill, the angle of twist of the secondary cutting edges, both the primary and the secondary minor cutting edges, should be at least 20° and at most 60°. Since both the primary and the secondary minor cutting edges extend along the same web and are essentially separated only by the secondary chip flute and the peripheral web portion associated with the primary minor cutting edge, there could be only very slight deviations between the twist angles of the primary and secondary minor cutting edges, wherein the twist angle, depending on the material to be drilled, can still have an influence on the smoothness of the wall of a bore being generated.

Alternatively, however, the drill may also have a smaller twist angle or a straight grooved drill with a twist angle of zero.

In one embodiment, the tip of the drill also has web thinnings of the drill core. This effectively leads to a shortening of the dead end in the center of the drill, thereby contributing to better centering during drilling and better penetration of the drill bit into the material to be drilled.

Further advantages, features and optional applications of the present invention will become apparent from the following description of a preferred embodiment and the accompanying figures.

DETAILED DESCRIPTION

Figure 1:
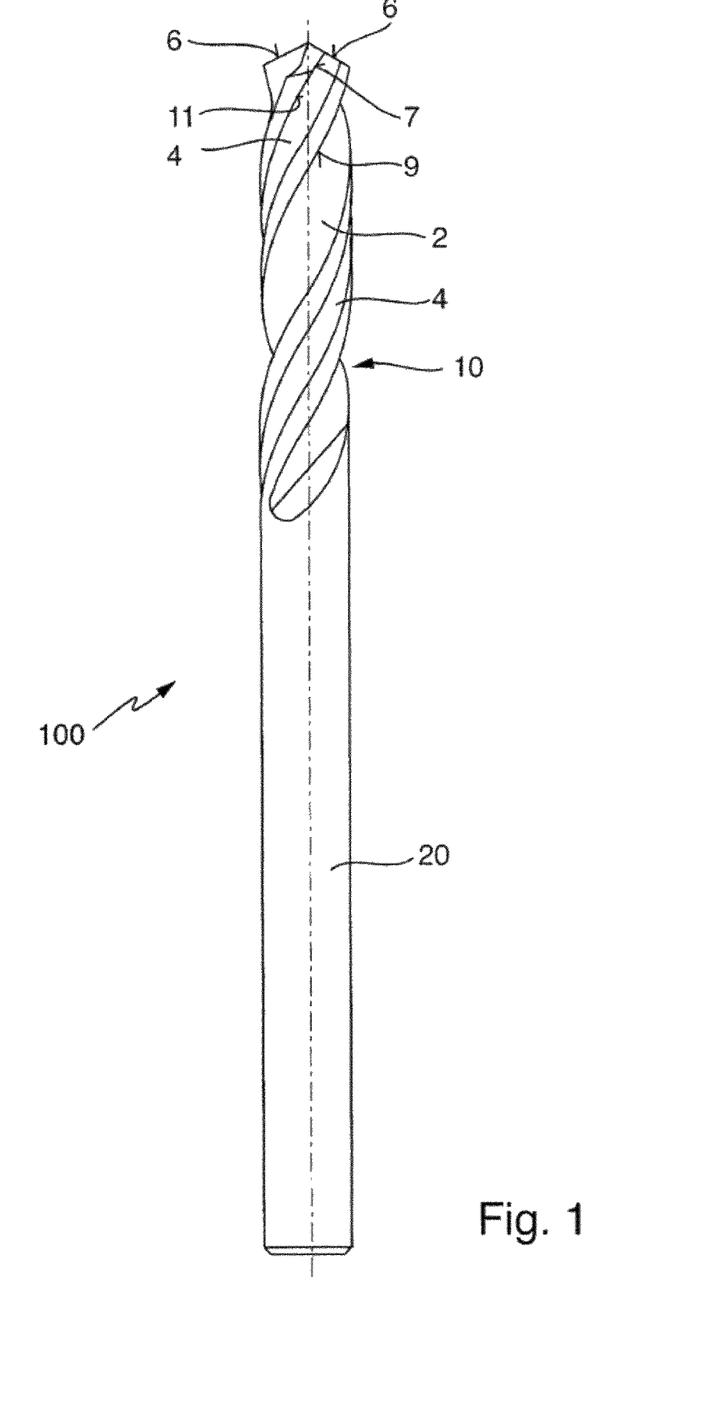
FIG. 1 is a side view of the drill according to the invention.

FIG. 1 shows a side view of a drill 100 according to the present invention, which has a shank 20 and a chip flute portion 10. The chip flute portion 10 is characterized by helically extending main chip flutes 2 and secondary chip flutes 4, which are respectively delimited by primary minor cutting edges 9 (also indicated as "main minor cutting edges) and secondary minor cutting edges 11. The twist angle, i. e. the angle included in the side view or in a planar development of the peripheral surface of the drill between the minor cutting edges 9 and 11 and the axis 50 is in the order of 30°.

The tip angle of the drill 100, i. e. the angle between the main cutting edges 6, in this case extending in straight line, is about 130°.

Further details of the drill tip are not shown in FIG. 1 and can be seen more clearly in the following detailed views of FIGS. 2-5.

Figure 2:
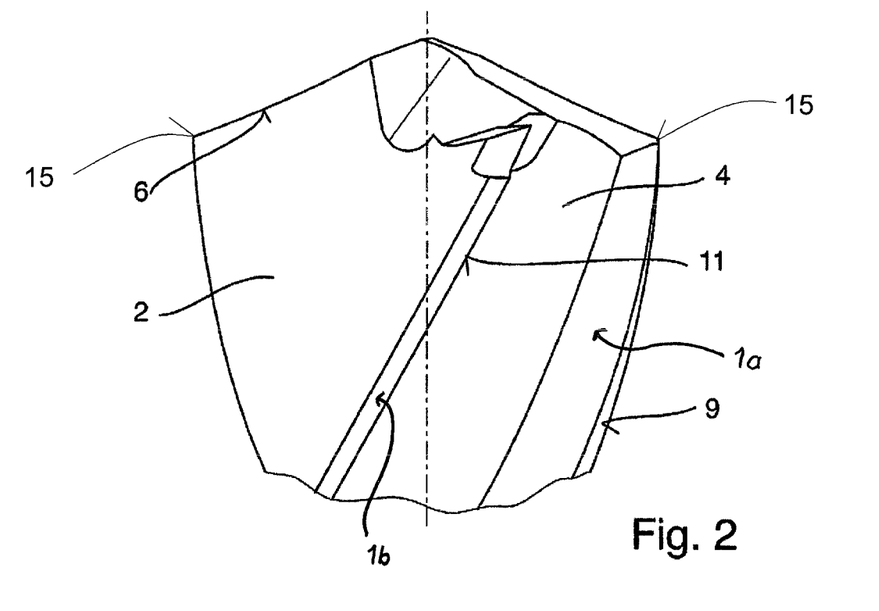
FIGS. 2 and 3 are enlarged side views of the drill tip from different viewing angles.

FIG. 2 shows an enlarged side view of the drill tip. The main chip flute 2 and the secondary chip flute 4, which divides the web into a main web 1a and a secondary web 1b, are shown with primary minor cutting edges 9 and secondary minor cutting edges 11 along the intersection of the chip flutes 2 and 4, respectively, with the peripheral surface at the radial outer face of the webs of the drill. The main web could also have a guiding surface defining the envelope surface of the drill, and otherwise be offset radially inward to ensure on the one hand a precise guide in the drill hole, but on the other hand also to reduce the friction on the borehole wall.

The side view of FIG. 2 corresponds to a viewing direction following the course of a tangent to the radially outer relief surface of the main chip flute in the region of the cutting corner 15.

Figure 3:
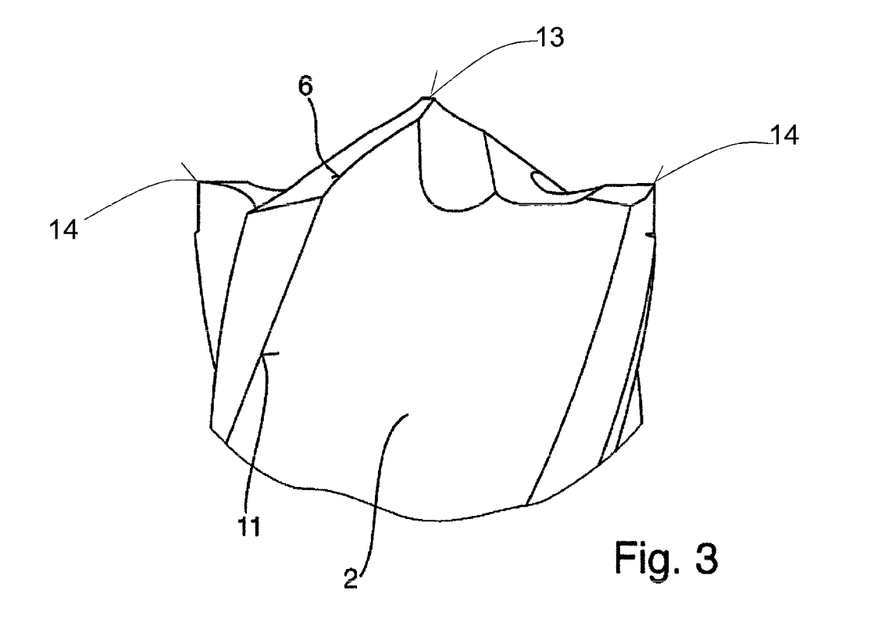

FIG. 3 shows an analogous view along a tangent to the relief surface of the secondary flute 4 in the region of the cutting edge 14.

Figure 4:
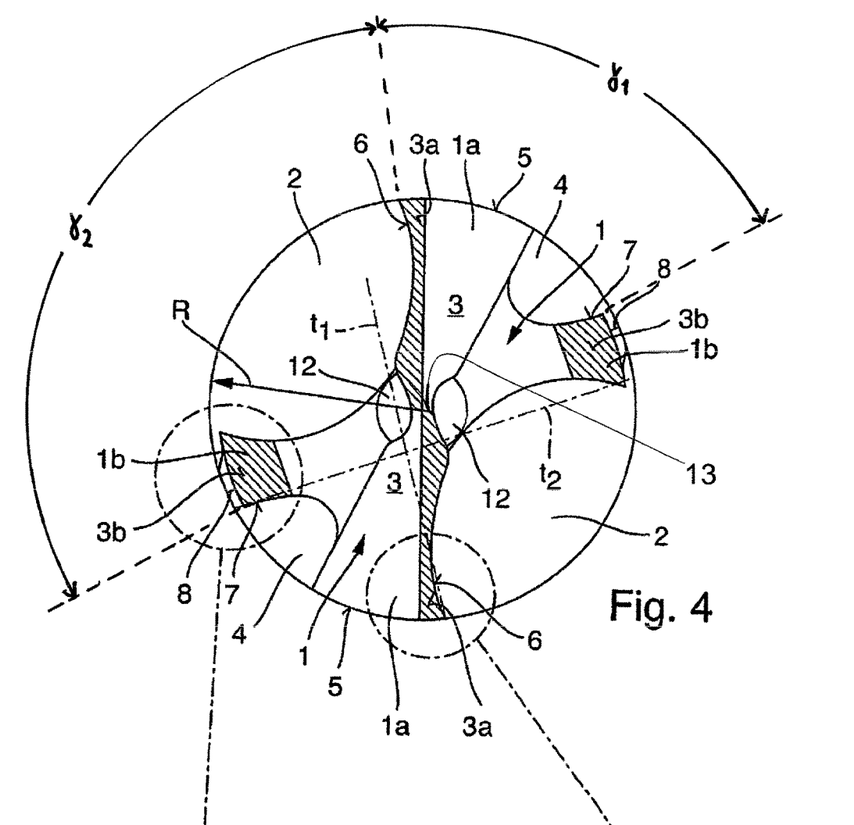
FIG. 4 is a top plan view of the tip of an embodiment of the drill according to the invention.

Considering the planar top-view of the end face along the axis of the drill according to the invention according to FIG. 4, substantial details of this drill will now be described.

The drill has two diametrically opposed main chip flutes 2 which rotate in a helical manner according to FIG. 1, and which are separated by corresponding webs 1, which are also diametrically opposite one another and follow the helical course of the main chip flutes 2. These webs 1 are in turn separated by a secondary flute 4 into a main web 1a and a secondary web 1b.

The front face 3 of the webs 1 defines main relief surfaces 3a and secondary relief surfaces 3b represented by hatchings, the main cutting edge 6 being formed by the intersection of the main relief surface 3a with a main chip flute 2 and the secondary cutting edge 7 being formed by the intersection of the secondary relief surface 3b with the secondary chip flute 4. The relief surfaces 3a and 3b are, apart from a small but necessary relief angle, approximately sections of conical surfaces as they would be produced by a rotating surface of the corresponding peripheral main cutting edges 6 and secondary cutting edges 7. The remaining sections of the end-face surface 3 of the webs 1 have a more distinct chamfer or are flattened or recessed, respectively, towards the shaft 20 and lie axially in each case in the axial direction behind the relief surfaces 3a and 3b and behind rotational surfaces generated by the main cutting edges and secondary cutting edges, respectively, when viewed from the tip of the drill and along the drill axis.

The circumferential angle γ1 between a primary minor cutting edge 9 and a secondary minor cutting edge 11 immediately following there behind in the working direction is smaller than the circumferential angle γ2 between a secondary minor cutting edge 11 and the primary minor cutting edge 9 following the same.

In the center of the drill, web thinnings 12 are visible which shorten the dead end 13 at the drill tip when compared to a drill without web thinnings and thus contribute to a better centering of the drill. Web thinnings are meant to define recesses of the drill core which are provided at the drill point, which is otherwise defined by a central cylindrical body which is inscribed in the drill and which is delimited by the base of the main cutting grooves 2 (without the web thinnings 12). The web thinnings 12 can be produced, for example, by grinding away parts of the drill core at the end face of the drill. The drill is preferably made of hard metal (cemented carbide) and can also have one or more coatings, which increase the wear resistance, also may improve the transport of the chip in the chip flutes and can also contribute to a better surface quality of the hole.

Figure 4A:
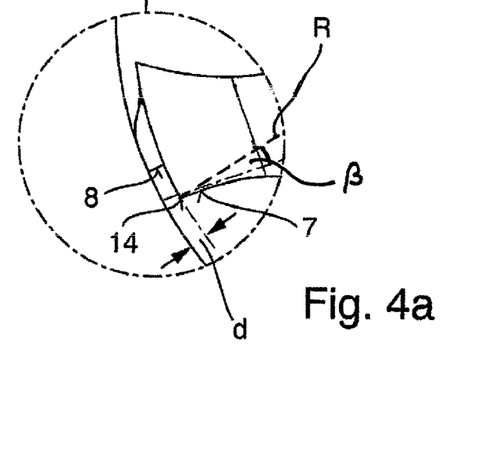
FIGS. 4a and 4b are cutouts from FIG. 4

The main cutting edge 6 extends radially outwards continuously up to a cutting corner 15 on the outer periphery of the drill, which is defined by the radius R. The secondary cutting edge 7, on the other hand, begins only at a greater distance from the center of the drill (starting at the radially inner end of the relief surface 3b shown in FIG. 4) and extends radially outwards only up to the cutting edge 14 at a distance d from the radius R defining the periphery or circumference of the drill, this distance d being of the order of a few hundredths to a few tenths of a millimeter. Details of the secondary edge 7 can be seen in the enlarged section 4a of FIG. 4. In addition, a tertiary cutting edge 8 axially recessed with regard to the secondary cutting edge 7 is visible which precisely bridges the remaining distance d of the secondary cutting edge 7 to the radius R.

However, while the secondary cutting edge 7, at least with its radially outer section, is located axially in front of the main cutting edge 6, when viewed in the axial direction, the tertiary cutting edge 8 is axially recessed so far as to lie axially behind the main cutting edge 6.

Figure 5:
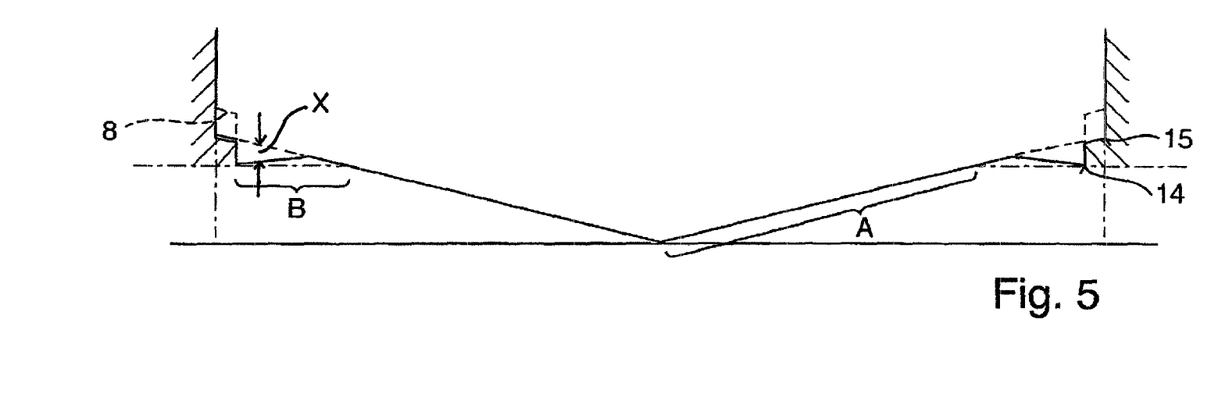
FIG. 5 is a schematic representation of the profile of the drill

The cutting edge profile of the main cutting edge 6 projected into a common plane, of the secondary cutting edge 7 and of the tertiary cutting edge 8 in the axially outer region of the drill is shown in FIG. 5.

Figure 4B:
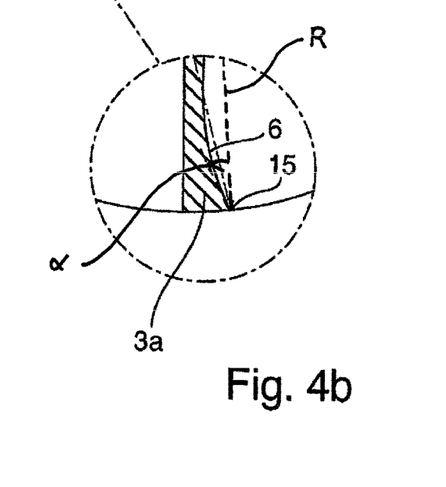

It can also be seen from the enlarged cut outs according to FIGS. 4a and 4b that the radial rake angle .α of the main cutting edge 6, which at the same time is the rake angle of the minor cutting edge 9, which is starting out from the region of the radially outermost cutting corner of the main cutting edge 6, is positive, i. e. a tangent to the main cutting edge 6 in the region of the radially outermost cutting corner cuts through the drill diameter to the left of the central axis 50, i. e. in the working direction behind the central axis 50 and forms the angle α together with a radius vector to the cutting edge 15 (see FIG. 4b). (The tangent $t_1$ is not exactly shown in FIGS. 4 and 4b as a tangent to the rake surface in the region of the cutting edge 15 because, in the case of the uniformly concave curvature of the main cutting edge 6, it should actually lie behind the cutting edge 6 as a whole.

The radial rake angle ⊕ of the secondary cutting edge 7 and the tertiary cutting edge 8, which is simultaneously the radial rake angle of the secondary minor cutting edge 11, is, however, negative, i. e. a tangent to the secondary cutting edge 7 in the region of its outer cutting corner 14 (see FIG. 4, 4a) cuts through the drill, when seen in the working direction, in front of the axis 50 and includes the angle β with a radius vector to the cutting edge 14 (see FIG. 4a).

The axial distance between the secondary cutting edge 7 and the tertiary cutting edge 8 is typically in the range of a few tenths of a millimeter but can also be up to 1 or 2 mm.

The axial rake angle of the main cutting edge 6 and the secondary cutting edge 7 is positive.

It can be seen from the drill profile in FIG. 5 that, for example, when drilling a plate-shaped laminate, the drill first passes through the material to be pierced at the center with the tip (see horizontal solid line) wherein the central aperture formed on the face where the drill exits is at first more and more increasing, starting from the center.

However, before the central aperture reaches the outer region of the bore, the breakthrough in the region near the outer diameter of the drill (see horizontal dashed line) is first effected by the most prominent cutting corner 14 of the secondary cutting edge 7, which thus separates a previously remaining annular portion of the width B of the material at the end of the bore. Depending on the material, however, it is also possible for the material remaining in the center of the bore to be axially displaced before the tip pierces there through so that the width B is significantly increased or is even separated as a complete disc extending from the center to the cutting corner 14. This cutting off of a ring or disc by the cutting edge 14 effectively leads to a good severing or cutting off of any fibers very close to the outer radius of the drill R, the remaining thin material layer then being removed by the cutting corner 15 of the main cutting edge 6, wherein the tertiary cutting edge 8 finally effects smoothing and post-processing of the wall surface and edge surface of the bore.

As a result, the main cutting edge of the drill can also be substantially preserved in the region where the secondary cutting edge projects axially beyond the main cutting edge, wherein due the small radial overhang d of the main cutting edge with respect to the secondary cutting edge 7, also the secondary cutting corner 15 of the main cutting edge 6 is only slightly loaded. This result remains effective as long as the secondary cutting edge 7 has a sufficient axial overlap against the main cutting edge 6. Only with a corresponding wear of the secondary cutting edge 7 through which the secondary cutting edge 7 becomes axially shortened to such an extent that it is at almost the same level as the main cutting edge, a regrinding and sharpening of the drill is required.

For purposes of original disclosure, it is to be understood that all features as they will become apparent to those skilled in the art from the present description, the drawings, and the dependent claims, even if specifically described only in connection with certain further features, can be combined in any combination with other of the features or feature groups disclosed herein, both individually and with reference to the appended claims, to the extent as this has not been expressively excluded or technical circumstances render such combinations impossible or meaningless. The comprehensive, explicit representation of all conceivable feature combinations and the emphasis on the independence of the individual features from each other is dispensed with here only for the sake of brevity and the legibility of the description.

The invention claimed is:

1. A drill for the drilling of laminates, comprising:
   at least two main chip flutes separated from each other by corresponding webs, free end faces of the webs forming relief surfaces;
   at least one secondary flute formed in a periphery of each of the webs, the at least one secondary flute dividing the web into a main web and a secondary web, wherein a main cutting edge is formed by an intersection of a main chip flute and a relief surface on the main web; and
   a secondary cutting edge formed by the intersection of the at least one secondary flute with a relief surface on the secondary web following the main cutting edge in a direction of operation, the main cutting edge extending to a nominal radius of the drill, wherein the secondary cutting edge terminates at a distance before the nominal radius, and axially projects with respect to the main cutting edge by an axial overhang at least along a radially outer section thereof.

2. The drill according to claim 1, wherein the distance is between 0.2% and 5% of the drill diameter or in between 0.01 mm and 0.2 mm.

3. The drill according to claim 1, wherein a tertiary cutting edge on the secondary web is axially recessed with respect to the main cutting edge and with respect to the secondary cutting edge, and in the projection on a radial plane covers the radial distance from the radially outer corner of the secondary cutting edge to the nominal radius of the drill.

4. The drill according to claim 1, wherein the main cutting edge defines a peak angle in the range between 60° and 170° at least in entire radially outer portions thereof.

5. The drill according to claim 1, wherein the axial overhang is between 0.1 mm and 0.8 mm.

6. The drill according to claim 1, wherein the axial overhang 90 along the secondary cutting edge increases with an increasing radius.

7. The drill according to claim 1, wherein the radial extension of the secondary cutting edge is less than half the drill radius.

8. The drill according to claim 1, wherein the secondary cutting edge extends over a length at a tip angle of between 180° and 200°.

9. The drill according to claim 1, wherein the main cutting edge is concave in a plan view along a drill axis at least in the region of a radially outer half.

10. The drill according to claim 1, wherein a primary minor cutting edge adjoining the main cutting edge has a positive radial cutting angle.

11. The drill according to claim 10, wherein a secondary minor cutting edge adjoining the secondary cutting edge has a negative radial cutting angle between 0 and −10°.

12. The drill according to claim 1, wherein a circumferential angle formed between a primary minor cutting edge and a secondary minor cutting edge directly following the secondary minor cutting edge is smaller than a circumferential angle formed between the secondary cutting edge and an immediately following primary minor cutting.

13. The drill according to claim 12, wherein a difference between the circumferential angles for a drill with two main cutting edges is at least 40 degrees.

14. The drill according to claim 12, wherein a difference between the circumferential angle for a drill with two main cutting edges is at most 70 degrees.

15. The drill according to claim 1, wherein a cross-sectional area of the main chip flutes is at least twice the cross-sectional area of the secondary chip flutes.

16. The drill according to claim 12, wherein the drill is a spiral drill.

17. The drill according to claim 12, wherein a twist angle of the secondary cutting edge is at least 20° and at most 60°.

18. The drill according to claim 1, wherein a tip of the drill includes web thinnings in a drill core which shorten a dead end of the drill.

* * * * *